(12) United States Patent
Prickel et al.

(10) Patent No.: US 9,258,938 B2
(45) Date of Patent: Feb. 16, 2016

(54) VARIABLE PLACEMENT HINGE FOR AGRICULTURAL IMPLEMENT TO MAINTAIN CONSTANT WORK ZONE SPACING

(71) Applicant: CNH America LLC, New Holland, PA (US)

(72) Inventors: Marvin A. Prickel, Homer Glen, IL (US); Michael J. Connors, Lockport, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/193,957

(22) Filed: Feb. 28, 2014

(65) Prior Publication Data

US 2015/0245556 A1 Sep. 3, 2015

(51) Int. Cl.
*G06F 7/70* (2006.01)
*G06F 19/00* (2011.01)
*G06G 7/00* (2006.01)
*G06G 7/76* (2006.01)
*A01C 7/20* (2006.01)

(52) U.S. Cl.
CPC ...................................... *A01C 7/201* (2013.01)

(58) Field of Classification Search
CPC ......... E02F 9/2025; E02F 9/26; E02F 9/2045; A01B 79/005; A01B 69/008
USPC .......................................................... 701/50
See application file for complete search history.

(56) References Cited

U.S. PATENT DOCUMENTS

| | | |
|---|---|---|
| 5,025,866 A | 6/1991 | Schmidt et al. |
| 5,669,452 A | 9/1997 | Wright et al. |
| 5,884,852 A | 3/1999 | Balmer |
| 5,957,383 A | 9/1999 | Benest |
| 6,422,483 B1 | 7/2002 | Yocom et al. |
| 6,494,154 B2 | 12/2002 | Kinzenbaw et al. |
| 6,834,223 B2 | 12/2004 | Strelioff et al. |
| 7,249,448 B2 | 7/2007 | Murphy et al. |
| 7,426,827 B2 | 9/2008 | Thompson et al. |
| 2004/0124605 A1 | 7/2004 | McClure et al. |
| 2012/0298388 A1 | 11/2012 | Bauer |
| 2013/0345937 A1* | 12/2013 | Strelioff et al. ................. 701/50 |

FOREIGN PATENT DOCUMENTS

| | | |
|---|---|---|
| DE | 4327400 | 2/1995 |
| EP | 2630856 | 8/2013 |

* cited by examiner

*Primary Examiner* — Maceeh Anwari
(74) *Attorney, Agent, or Firm* — Rebecca L. Henkel (57) ABSTRACT

An agricultural implement is provided that has a variable placement hinge joint that allows adjacent implement sections to flex relative to each other and can be moved by an actuator to control spacing between adjacent work zones defined by the implement sections. This can be done by detecting relative angle changes between adjacent implement sections and moving the hinge joint to maintain a constant distance between the work zones so that row spacing is substantially constant across the entire implement, even between adjacent ground-engaging tools or other working units of different implement sections.

20 Claims, 6 Drawing Sheets

VARIABLE PLACEMENT HINGE FOR AGRICULTURAL IMPLEMENT TO MAINTAIN CONSTANT WORK ZONE SPACING

FIELD OF THE INVENTION

The subject matter disclosed herein relates generally to the agricultural implements and, in particular, to implements with folding or rotating flame sections that allow for transporting the implements on the road in relatively compact configurations and sections or segments having independent ground-following capabilities when in work positions.

BACKGROUND OF THE INVENTION

Modern farming practices strive to minimize operating expenses. One way of reducing operating expenses is to increase the size of planting and seeding implements so as to reduce the amount of tractor operational time required for planting or seeding. Large planting and seeding implements may include multiple implement sections such as boom sections, toolbar sections, and/or wing sections that are hinged to each other at joints, typically single fixed joints, to allow the implement to flex by pivoting at the joints to accommodate uneven terrain in agricultural fields. Downward flexing at the joint causes the implement sections on opposite sides of the joint to move closer to each other. When the implement sections move closer to each other, a pair of ground-engaging tools or other working units closest to and on opposite sides of the joint can potentially collide with each other. This can limit will flex due to the ground-engaging equipment hitting each other. Upward flexing at a joint causes implement sections on opposite sides of the joint to move away from each other. In this way, despite using precision agricultural guidance systems, the implement flexing can create spacing inconsistencies between planted rows or areas in the field at boundaries between adjacent work zones that are worked by adjacent implement sections. Spacing inconsistencies can reduce the accuracy of subsequent product application or harvesting from non-matching precision product placement row equipment.

SUMMARY OF THE INVENTION

The present invention is directed to an agricultural implement that has a variable placement hinge joint that allows adjacent implement sections to flex relative to each other and can be moved by an actuator to control spacing between adjacent work zones defined by the implement sections which may correspond to controlling row spacing of adjacent rows of seeds defining boundaries between the adjacent work zones. This can be done by detecting relative angle changes between adjacent implement sections and moving the hinge joint to maintain a constant distance between the work zones so that row spacing is substantially constant across the entire implement, even between adjacent ground-engaging tools or other working units of different implement sections and thus different work zones.

According to one aspect of the invention, a method is provided for maintaining a constant spacing between adjacent work zones of an agricultural implement. The method includes determining a target spacing between adjacent work zones of an agricultural implement. A deviation from the target spacing is detected. At least one of the work zones is moved to attenuate the deviation from the target spacing.

According to another aspect of the invention, the work zones are defined by adjacent implement sections of the agricultural implement. A hinge joint of the agricultural implement may define a hinge pivot axis allowing the implement sections to pivot with respect to each other. A pivot knuckle may support the hinge joint and define a knuckle pivot axis about which the pivot knuckle pivots for moving the hinge joint toward or away from a centerline of the agricultural implement to adjust spacing between the work zones. This attenuates implement flexing-induced deviation from the target spacing of the work zones.

According to another aspect of the invention, detecting the deviation from the target spacing includes detecting a change in a vertical position of at least one of the implement sections, which may include detecting a change in relative angle between the implement sections. The implement sections may include a first implement section defining a reference implement section and the change in relative angle is detected between a second implement section and the reference implement section. An angle sensor(s) may be arranged with respect to the reference and second implement sections to provide a signal corresponding to an amount of deviation from a base-calibrated zero position. In the base-calibrated zero position, the reference implement section and second implement section may be aligned with and/or parallel to each other in a non-flexed position of the implement. This can be done for automatically maintaining target spacing between work zones.

According to another aspect of the invention, when a positive angle of deviation is detected corresponding to the second implement section extending angularly upwardly relative to the reference implement section, the second implement section is moved closer to the reference implement section. When a negative angle of deviation is detected corresponding to the second implement section extending angularly downwardly relative to the reference implement section, the second implement section is moved away from the reference implement section. A controller may receive a signal(s) from the sensor(s) to control an actuator to move the second implement section away from the reference implement section. An amount of movement of the second implement section toward or away from the reference implement section corresponds to an amount of upward or downward angular deviation, respectively, of the second implement section relative to the reference implement section. This allows for correcting variations in spacing between work zones as a function of how much deviation is occurring relative to a target spacing.

According to another aspect of the invention, an agricultural implement is provided. The implement includes a first implement section defining a first work zone covering a first portion of an agricultural field worked by the first implement section. A second implement section defines a second work zone covering a second portion of an agricultural field worked by the second implement section. A hinge joint is arranged between the first and second sections allowing flexing of the agricultural implement for accommodating uneven terrain of the agricultural field. A pivot knuckle is arranged between the hinge joint and at least one of the first and second implement sections. The pivot knuckle is movable for moving the hinge joint to maintain a constant spacing between the work zones. Ai angle sensor may be arranged with respect to the first and second implement sections to provide a signal corresponding to an amount of deviation from a reference position. An actuator moves the pivot knuckle to drive movement of the hinge joint to maintain a constant spacing between the work zones. The pivot knuckle may define a pivot knuckle axis arranged parallel to a longitudinal axis of the agricultural implement and may be arranged parallel to the hinge pivot axis for allowing a position of the hinge pivot axis to be transversely adjusted for maintaining the constant spacing between the works zones. The amount or degree of pivot knuckle travel is a function of angular deviation and pivot knuckle position, which may be sensed by a sensor. This provides a compact design of a variable position hinge joint for adjusting position of a pivot axis about which adjacent implement sections flex to control a spacing width boundary between the adjacent implement sections.

According to another aspect of the invention, adjustment of the hinge joint by its variable movement can be automatically controlled by a control system when the implement is in a working state or mode. When the implement is in a nonworking or transport state or mode, the control system returns the hinge joint to and maintains the hinge joint in a transport position, such as the base-calibrated zero position. This ensures sufficient clearance between implement sections when folded during transport. Secondary locking may be used when in storage.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

The drawings furnished herewith illustrate a preferred construction of the present invention in which the above advantages and features are clearly disclosed as well as others which will be readily understood from the following description of the illustrated embodiment.

DETAILED DESCRIPTION

Figure 1:
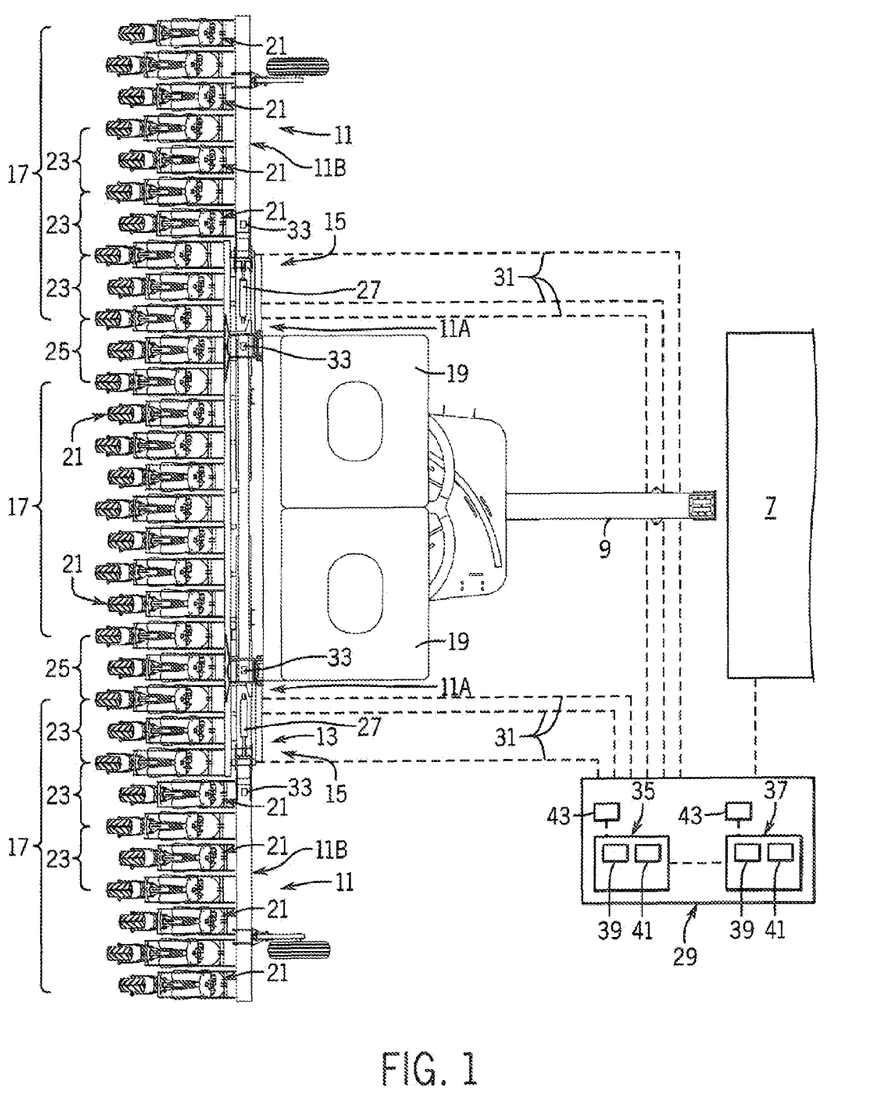
FIG. 1 is a partially schematic pictorial view of a tractor towing an agricultural implement that incorporates a variable work zone spacing system in accordance with the present invention.

Referring now to the drawings and specifically to FIG. 1, an agricultural implement 5 is shown towed behind a tractor 7, shown in schematic form, by way of a drawpole 9 that is aligned with a centerline or longitudinal axis of the implement 5. Implement sections 11 are connected to each other through a variable work zone spacing system 13. The variable work zone spacing system 13 includes variable placement hinge joint assemblies 15 interconnecting adjacent implement sections 11. The hinge joint assemblies 15 allow the implement 5 to flex by passively allowing the implement sections 11 to pivot with respect to each other for accommodating uneven terrain of the agricultural field and are configured to adjust spacing between adjacent works zones 17 defined by portions of respective implement sections 11, as described in greater detail elsewhere herein. Implement 5 is shown here as a bulk fill planter with toolbar sections or boom sections that define the implement sections 11. The planter has centrally located seed hoppers 19 that store seed for pneumatic delivery to row units 21 that can singulate and deposit seeds into furrows formed by ground-engaging tools of the row units 21. It is understood that, beside planters, the variable work zone spacing system 13 may be incorporated into other agricultural implements with hinge-connected implement segments or sections, such as seeders, sprayers, and other product applicators.

Still referring to FIG. 1, within each work zone 17, intra-zone spacings 23 are defined by fixed row spacings between adjacent row units 21 of the respective implement sections 11. Inter-zone spacings 25 are defined by variable width row spacings adjacent work zones 17. A distance between adjacent row units 21 on opposite sides of the hinge joint assembly 15 corresponds to the width of the inter-zone spacings 25 with the row units 21 supported by adjacent implement sections 11, whereby the row units 21 defining the inter-zone spacing 25 straddle a boundary between adjacent work zones 17.

Still referring to FIG. 1, an actuator 27 is arranged to adjust positions of components of the variable placement hinge joint assemblies 15 as controlled by a control system 29. The actuator 27 is shown as a hydraulic ram that is operably connected to a hydraulic system (not shown) including control valving of the implement 5 that can be operably connected to a hydraulic system (not shown) of the tractor 7. Conductors 31 operably connect to the actuator 27 and sensors 33 to the control system 29 for monitoring and controlling the variable work zone spacing system 13. The sensors 33 are arranged for detecting angular or other position changes of the implement sections 11 with respect to each other. At least some of the sensors 33 can be integrated into the actuator(s) 27 or other component(s), or be stand-alone-type dedicated devices, mounted for position or other sensing of the respective component being monitored or evaluated. At least one of the sensors 33 can be arranged at an inwardly disposed implement section 11, such as the implement section 11 at a middle portion of the implement 5, which may define a reference implement section 11A. At least one of the sensors 33 can also be arranged at an outwardly disposed implement section 11B for evaluating the relative position of the outwardly disposed implement section 11B relative to the reference implement section 1 1A. At least some of the sensors 33 can also be arranged at various pivot axes or other portions of the hinge joint assembly 15 to define pivot axis sensors or pivot axis position sensors for determining relative position(s) of an axis or axes. Sensors 33 may include angle sensors configured to provide a signal(s) to report a change in position to the control system 29 such as a change in angular position relative to a base-calibrated zero position that may correspond to the reference implement section 11A and outer implement section 11B being aligned with each other. Sensors 33 may include position sensors configured to provide a signal(s) to report a change in displacement or relative position of various components to the control system 29 corresponding to an appropriate location that obtains a target spacing resulting in an equalized work width. For example, a target spacing may be obtained when the infra-zone spacing(s) 23 and inter-zone spacing(s) 25 are approximately equal, such as within about 10% of each other.

As another example, the sensors 33 are arranged within implement 15 and cooperate with the control system 29 for determining average angle and/or position values to compare with threshold angle and/or position values for repositioning parts of the hinge joint assembly 15 to maintain target work zone spacing which may correspond to target row spacing.

Still referring to FIG. 1, the control system 29 is shown as including an implement controller 35 and a tractor controller 37 that operably communicate with each other, for example, by way of an ISOBUS connection, for coordinating controls of the implement 5 and tractor 7. Each of the implement and tractor controllers 35, 37 includes a controller 39 and power supply 41, as is known, for controlling the functions and various systems of the implement 5 and tractor 7. Each controller 39 can include an industrial computer or, e.g., a programmable logic controller (PLC), along with corresponding software and suitable memory for storing such software and hardware including interconnecting conductors for power and signal transmission for controlling electronic, electro-mechanical, and hydraulic components of the implement 5 and tractor 7. Each of the implement and tractor controllers 35, 37 may be operably connected to interface systems 43 which may include a monitor and various input devices to allow an operator to see the statuses and control various operations of the implement 5 and tractor 7.

Figure 2:
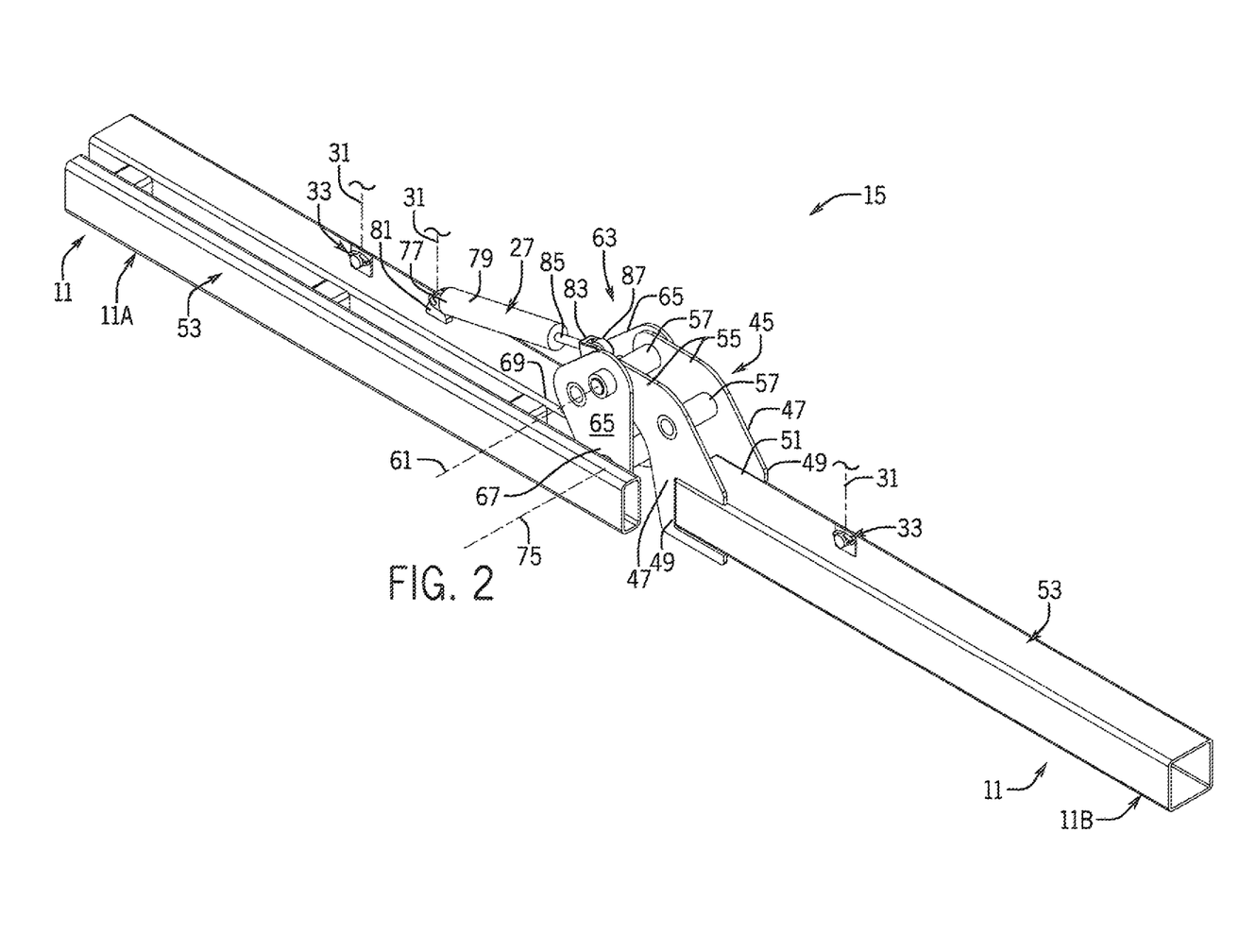
FIG. 2 is a pictorial view of a portion of the agricultural implement of FIG. 1.
Figure 3:
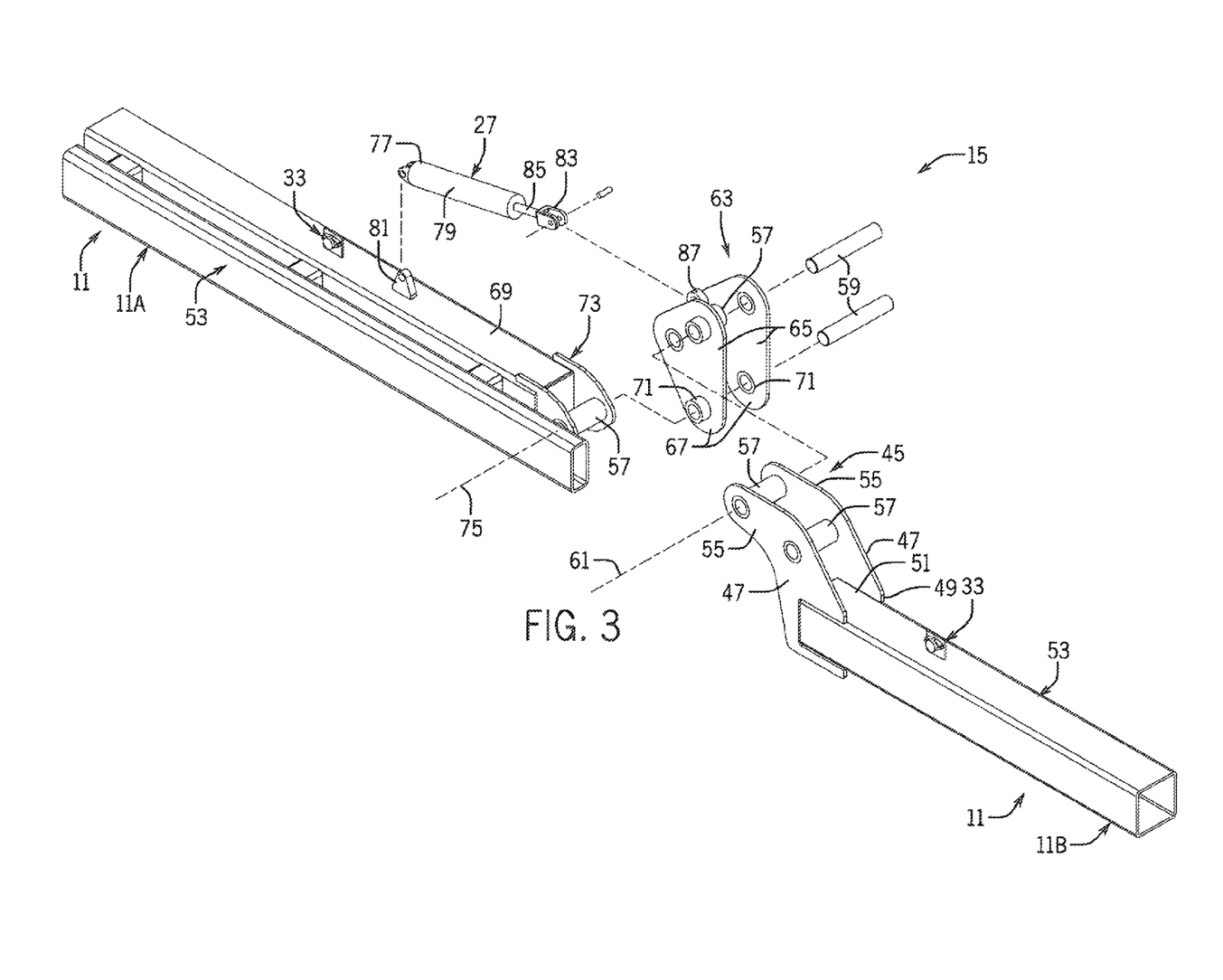
FIG. 3 is a pictorial exploded view of the portion of the agricultural implement of FIG. 2.

Referring now to FIGS. 2 and 3, each variable placement hinge joint assembly 15 has a hinge joint 45 that includes a pair of plates 47 defining an upside down L-shape with a lower end 49 connected to an end 51 of a boom section 53 defining an outer one of the implement sections 11. Upper ends 55 of the plates 47 are arranged above and longitudinally spaced from the end 51 of the boom section 53, providing a cantilevered arrangement of the plates 47 relative to the boom section 53. Sleeves 57 extend transversely between and interconnect the plates 47. A pin 59 (FIG. 3) extends through the outermost sleeve 57 of the hinge joint 45 and defines a hinge pivot axis 61, which is movable to adjust between row spacings at the inter-zone spacings 25 (FIG. 1) and thus controls spacing between adjacent work zones 17 (FIG. 1). Movement of the hinge joint 45 is done by moving a pivot knuckle 63 that supports the hinge joint 45. It is understood that yet other profiles are included that provide such multiple independent and interconnected pivots.

Still referring to FIGS. 2 and 3, the pivot knuckle 63 includes a pair of plates 65 connected to each other with a sleeve 57 (FIG. 3). Each plate 65 of the pivot knuckle 63 defines a triangular shape having a lower end 67 that is pivot-connected to an end 69 of a boom section 53 defining an inner one of the implement sections 11. This is done with a pin 59 that extends through holes 71 in the lower ends 67 of the plates 65 and through a sleeve 57 supported by a bracket 73 at the end 69 of inward boom section 53 to define a knuckle pivot axis 75. The knuckle pivot axis 75 is parallel to the hinge pivot axis 61 and the longitudinal axis of the implement 5. The interconnection of the implement sections 11 through the hinge joint 45 end of the pivot knuckle 63 allows pivoting movement of the pivot knuckle 63 about the knuckle pivot axis 75 to be translated into an arching movement of the hinge pivot axis 61 along a path aligned in a transverse direction relative to the longitudinal axis of the implement 5. This allows movement of the hinge pivot axis 61, toward or away from the longitudinal axis of the implement 5 to vary the width dimensions of the inter-zone spacings 25 and thus the distance between adjacent implement sections 11 and works zones 17.

Still retelling to FIGS. 2 and 3, an end 77 of a cylinder 79 of the actuator 27 is connected to a bracket 81 mounted to the reference implement section 11A. A yoke 83 on an end of a rod 85 that extends from and retracts into the cylinder 79 is attached to a tab 87 of the sleeve 57 of the pivot knuckle 63. In this way, the control system 29 commands the actuator 27 to extend, the rod 85 extends and pushes the pivot knuckle 63 to pivot about the knuckle pivot axis 75, which moves the upper end of the pivot knuckle 63 and the hinge pivot axis 61 away from and normal with respect to the centerline of the implement 5 to widen the inter-zone spacing 25. When the control system 29 commands the actuator 27 to retract, the rod 85 retracts and pulls the pivot knuckle 63 to pivot about the knuckle pivot axis 75 in the opposite direction, which moves the upper end of the pivot knuckle 63 and the hinge pivot axis 61 toward and normal with respect to the centerline of the implement 5 to narrow the inter-zone spacing 25.

Figure 4:
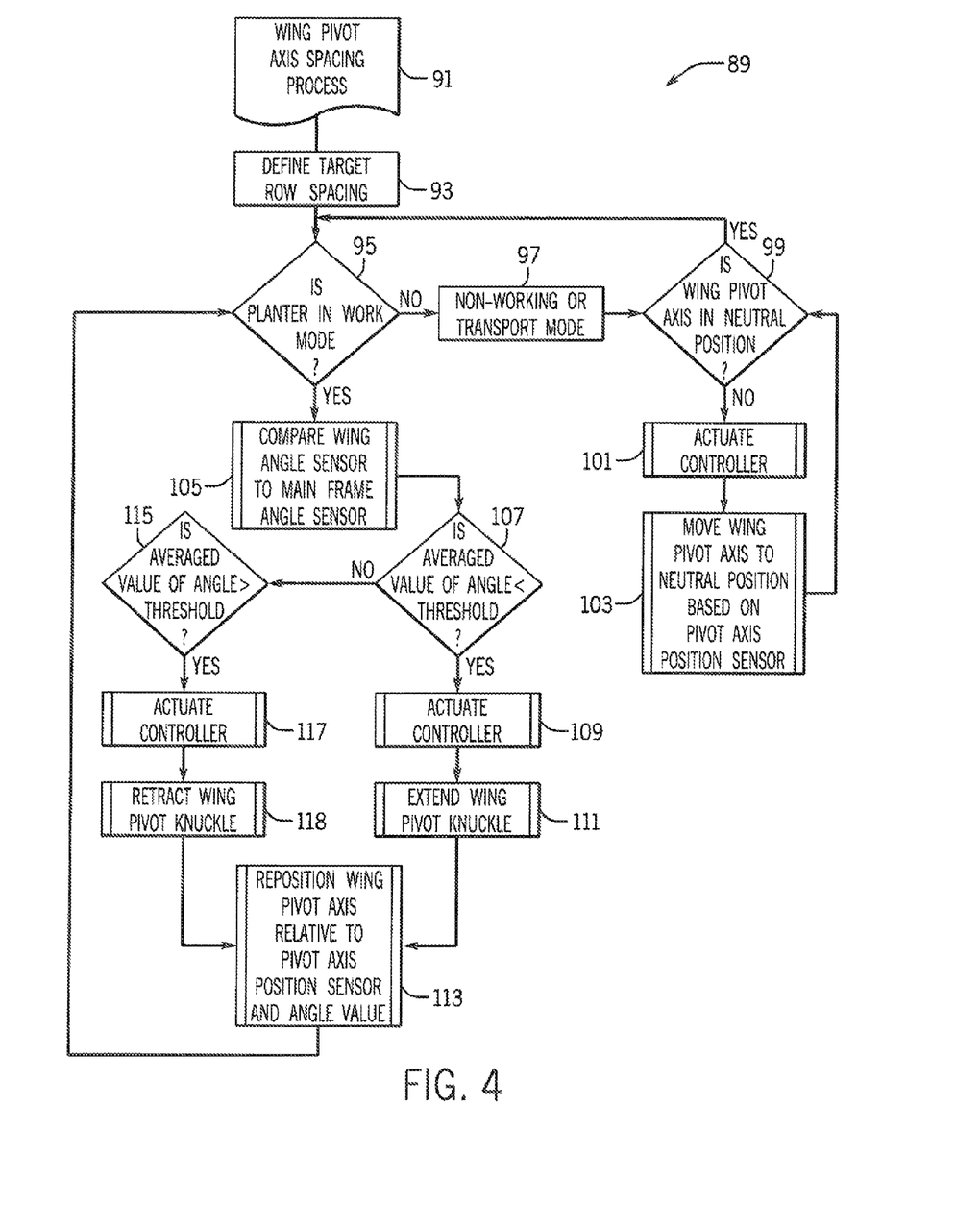
FIG. 4 is a flowchart of a procedure for varying work zone spacing of the agricultural implement of FIG. 1.
Figure 5:
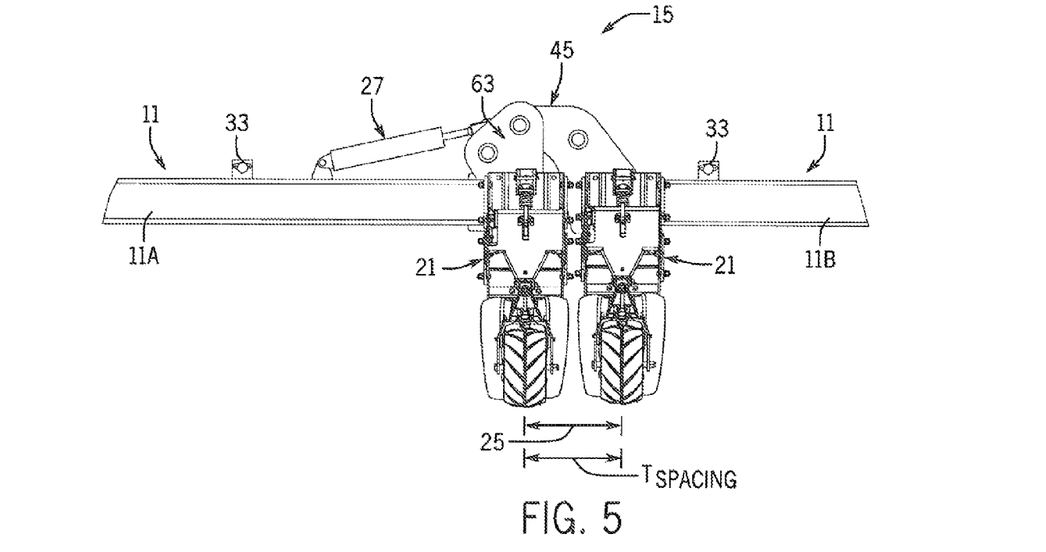
FIG. 5 is a front elevation view of a hinge joint assembly of the agricultural implement in a base-calibrated zero position.

Referring now to FIG. 4 and with further reference to FIGS. 1 and 5, an exemplary use of the variable work zone spacing system 13 in a planter as implement 5 is schematically represented as method 89 by way of a pivot axis spacing process represented at block 91. As represented at block 93, the control system 29 defines a target spacing Tspacing (FIG. 5) between adjacent work zones 17 and thus a target row spacing between adjacent rows of seeds defining boundaries between the adjacent work zones. This may correspond to the inter-zone spacing(s) 25 having the same spacing as the intra-zone spacing(s) 23 to provide consistent spacings continuously along the entire width of the implement 5. In this way, the intra-zone spacing(s) 23 may define the target spacing for the inter-zone spacing(s) 25, which may correspond to the inter-zone spacings) 25 when the implement sections 11 and components of the hinge joint assemblies 15 are in the base-calibrated zero position(s), such as that shown in FIG. 5.

Referring still to FIG. 4 with further reference to FIGS. 1 and 5, as represented at blocks 95 and 97, the control system 29 determines an operational mode of the variable work zone spacing system 13. The operational mode may be user-selected or established by the control system 29 based on other operations of the agricultural implement 5, such as deactivating the implement 5 or beginning a folding sequence for on-road transport of the implement 5. If the planter is not in work mode, but is instead in a nonworking or transport mode according to block 97, then the control system 29 determines whether a wing pivot axis, such as the hinge pivot axis 61, is in a neutral position (FIG. 5), as represented at block 99. If the wing pivot axis is not in the neutral position, then, as represented at block 101, the control system 29 commands actuation of the actuator 27 to move the pivot axis to the neutral position (FIG. 5) based on a sensed position from a sensor 33 defining a pivot axis position sensor as represented at block 103. The control system 29 again interrogates the respective sensors 33 to determine whether the Internet axis is in the neutral position and then further evaluates whether the planter is still in the nonworking or transport mode or whether the planter is in work mode. If the planter is in work mode, and as represented by block 105, the control system 29 compares signals from respective sensors 33 defining wing angle sensors and main frame angle sensors. This allows the control system 29 to evaluate whether there is a deviation from the target spacing Tspacing by way of signals from sensors 33 and, if deviation is detected, whether the magnitude is sufficiently large to justify a corrective action. As represented at block 107, this evaluation can include comparing an average angle value to a threshold value that may be a predetermined threshold value stored in the control system 29 less than which indicates a downward wing flex. As represented at blocks 109 and 111, if the average angle value is less than the threshold, then the control system 29 commands actuation of the actuator 27 to extend the pivot knuckle 63 to move the hinge pivot axis 61, which repositions the wing or hinge pivot axis 61 relative to positions determined by the pivot axis position sensor and angle value, as represented at block 113. As represented at block 115, if the determination at block 107 is that the average value of angle is not less than threshold, then the average angle value is compared to a threshold value that may be a predetermined threshold value stored in the control system 29 greater than which indicates an upward wing flex. As represented at blocks 117 and 118, if the average angle value is greater than the threshold, then the control system 29 commands actuation of the actuator 27 to retract the pivot knuckle 63 to move the hinge pivot axis 61, which repositions the wing or hinge pivot axis 61 relative to positions determined by the pivot axis position sensor and angle value, again as represented at block 113. The control system 29 then reevaluates whether the planter is in work mode at block 95.

Figure 6:
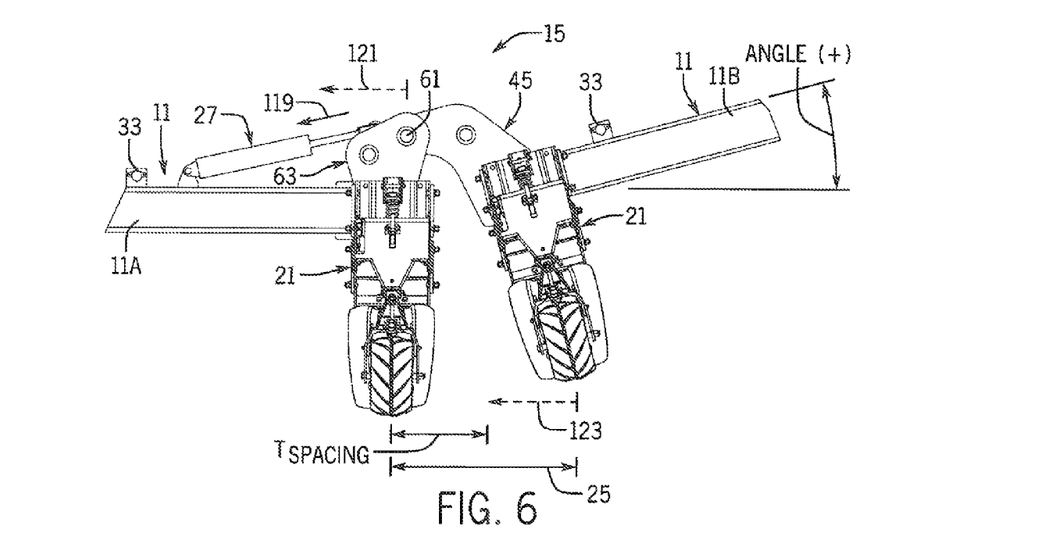
FIG. 6 is a front elevation view of the hinge joint assembly of the agricultural implement of FIG. 5 in a flex-up position.

Referring now to FIGS. 5 and 6, compared to the base-calibrated zero position shown in FIG. 5, the implement sections 11 in FIG. 6 show a flex-up position. This may happen in an agricultural field when the implement 5 is pulled over uneven terrain and a wheel support in the outer implement section 11B is forced higher than a wheel supporting the preference implement section 11A. This defines a positive angle of deviation Angle (+) shown in FIG. 6 relative to the base-calibrated zero position shown in FIG. 5. The sensors 33 send a signal(s) to report a change in position to the control system 29 indicating the amount of position change, such as corresponding to a direction and magnitude of the positive angle of deviation. In response to such signal, the control system 29 pulls the outer implement section 11B inward, closer to the longitudinal axis of the implement 5. This is done by retracting the actuator 27 as represented by the solid arrow labeled 119 to pull the pivot knuckle 63 to pivot over the knuckle pivot axis 75 (FIG. 2) toward the longitudinal axis of the implement 5, providing a corrective translation of the hinge pivot axis 61 in the same direction as represented by the dashed arrow labeled 121. This correspondingly moves the row unit 21 mounted on the outer implement section 11B toward the longitudinal axis of the implement 5 to reduce the width of the inter-zone spacing 25 to approach the width of the target spacing $T_{spacing}$ as represented by the dashed arrow 123. The corrective translation of the hinge pivot axis 61 can be performed until a position sensor provides a signal to the control system 29 indicating that the target spacing $T_{spacing}$ has been achieved. In another embodiment, the control system 29 includes a lookup table stored in memory with a value for how much correction is required based on the amount of deviation that was detected relative to the base-calibrated zero position, and the control system 29 uses such value to make the correction.

Figure 7:
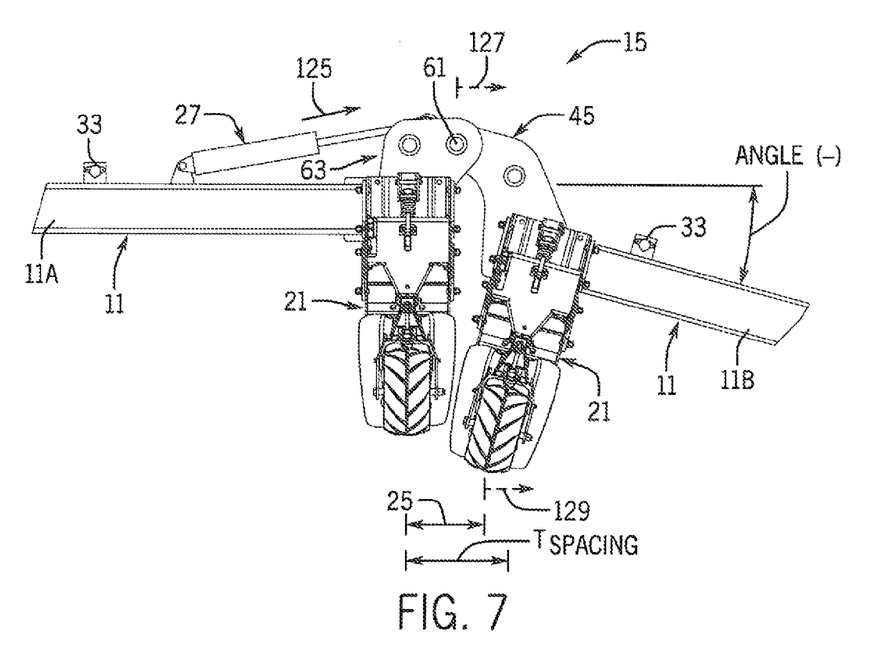
FIG. 7 is a front elevation view of the hinge joint assembly of the agricultural implement of FIG. 5 in a flex-down position.

Referring now to FIGS. 5 and 7, compared to the base-calibrated zero position shown in FIG. 5, the implement sections 11 in FIG. 7 show a flex-down position. This may happen in an agricultural field when the implement 5 is pulled over uneven terrain and a wheel support in the outer implement section 11B is forced lower than a wheel supporting the preference implement section 11A. This defines a negative angle of deviation Angle (−) shown in FIG. 7 relative to the base-calibrated zero position shown in FIG. 5. The sensors 33 send a signal(s) to report a change in position to the control system 29 indicating the amount of negative change, such as corresponding to a direction and magnitude of the negative angle of deviation. In response to such signal, the control system 29 pushes the outer implement section 11B outward, farther from the longitudinal axis of the implement 5. This is done by extending the actuator 27 as represented by the solid arrow labeled 125 to push the pivot knuckle 63 to pivot over the knuckle pivot axis 75 (FIG. 2) away from the longitudinal axis of the implement 5, providing a corrective translation of the hinge pivot axis 61 in the same direction as represented by the dashed arrow labeled 127. This correspondingly moves the row unit 21 mounted on the outer implement section 11B away from the longitudinal axis of the implement 5 to increase the width of the inter-zone spacing 25 to approach the width of the target spacing $T_{spacing}$ as represented by the dashed arrow 129. As mentioned above with respect to the flex-up position, the amount of corrective translation of the hinge pivot axis 61 to correct a flex-down position can be performed until a position sensor indicates that the target spacing $T_{spacing}$ has been achieved or to a predetermined amount for a particular amount of negative angle of deviation Angle (−) provided in a lookup table stored in memory within the control system 29.

Many changes and modifications could be made to the invention without departing from the spirit thereof. The scope of these changes will become apparent from the appended claims.

We claim:

1. A method of maintaining a constant spacing between adjacent work zones of an agricultural implement, the method including:
    interconnecting first and second adjacent implement sections of the agricultural implement;
    determining a target spacing between the adjacent implement sections of an agricultural implement which define the adjacent work zones, the target spacing between the adjacent implement sections corresponding to a row spacing of adjacent rows of seeds and defining boundaries between the adjacent work zones;
    detecting a deviation from the target spacing with a sensor arrangement; and
    moving at least one of the implement sections to attenuate the deviation from the target spacing.

2. The method of claim 1 wherein the agricultural implement includes a hinge joint defining a hinge pivot axis allowing the adjacent implement sections to pivot with respect to each other and a pivot knuckle supporting the hinge joint and defining a knuckle pivot axis about which the pivot knuckle pivots for moving the hinge joint toward or away from a centerline of the agricultural implement to adjust spacing between the adjacent implement sections and attenuate the deviation from the target spacing.

3. The method of claim 2, further comprising a second sensor arrangement for detecting a working mode or a non-working mode of the agricultural implement, wherein when the working mode is detected, a controller commands movement of a pivot knuckle to adjust spacing between the work zones and attenuate the deviation from the target spacing and, when the nonworking mode is detected, the controller commands movement of pivot knuckle to a neutral position.

4. The method of claim 1 wherein detecting the deviation from the target spacing includes detecting at least one of a change in a vertical position and change in a relative angle between respective implement sections.

5. The method of claim 4 wherein the first implement section defining a reference implement section, and the change in relative angle is detected between the second implement section and the reference implement section.

6. The method of claim 5 further comprising the step of defining an angle of deviation such that when a positive angle of deviation is detected corresponding to the second implement section extending angularly upwardly relative to the reference implement section, the second implement section is moved closer to the reference implement section and when a negative angle of deviation is detected corresponding to the second implement section extending angularly downwardly relative to the reference implement section, the second implement section is moved away from the reference implement section.

7. The method of claim 6 wherein an amount of movement of the second implement section closer to the reference implement section corresponds to an amount of upward angular deviation of the second implement section relative to the reference implement section.

8. The method of claim 7 wherein the sensor arrangement includes an angle sensor is arranged with respect to the reference and second implement sections to provide a signal corresponding to the detected positive angle of deviation to a controller that controls an actuator to move the second implement section closer to the reference implement section.

9. The method of claim 8 wherein the signal from the angle sensor corresponds to a change in position of the second implement relative to a base-calibrated zero position in which the reference and second implement sections are aligned with or parallel to each other.

10. The method of claim 9 wherein the sensor arrangement includes an axis position sensor and wherein an angular value corresponding to the change in position of the angle of deviation is compared to an axis position of the hinge pivot axis determined at least in part by the axis position sensor.

11. The method of claim 10 wherein the controller is activated to command movement of the hinge pivot axis based on a signal from the axis position sensor and the angle of deviation.

12. The method of claim 6 wherein an amount of movement of the second implement section away from the reference implement section corresponds to an amount of downward angular deviation of the second implement section relative to the reference implement section.

13. The method of claim 12 wherein the sensor arrangement includes an angle sensor, the angle sensor being arranged with respect to the reference and second implement sections to provide a signal corresponding to the detected negative angle of deviation to a controller that controls an actuator to move the second implement section away from the reference implement section.

14. The method of claim 13 wherein the signal from the angle sensor corresponds to a change in position of the second implement relative to a base-calibrated zero position in which the reference and second implement sections are aligned with or parallel to each other.

15. The method of claim 14 wherein the sensor arrangement includes an axis position sensor and wherein an angular value corresponding to the change in position of the angle of deviation is compared to an axis position of the hinge pivot axis determined at least in part by the axis position sensor.

16. The method of claim 15 wherein the controller is activated to command movement of the hinge pivot axis based on a signal from the axis position sensor and the angle of deviation.

17. A method of maintaining a constant spacing between adjacent work zones of an agricultural implement, the method including:
    interconnecting first and second adjacent implement sections of the agricultural implement, the first implement section extending along an axis;
    determining a target spacing along the axis between the adjacent implement sections, wherein a hinge joint is arranged between the adjacent implement sections to allow pivoting therebetween about a hinge pivot axis and movement of the second implement along the axis; and
    moving the hinge pivot axis to maintain the target spacing between the adjacent implement sections;
wherein the first and second adjacent implement sections define the work zones of the agricultural implement.

18. The method of claim 17 further comprising pivoting the hinge joint about a knuckle pivot axis to move from the hinge pivot axis for maintaining the target spacing between the adjacent implement sections and wherein the knuckle pivot axis is defined at a pivot knuckle arranged between the hinge joint and at least one of the adjacent implement sections.

19. An agricultural implement, comprising:
    a first implement section extending along an axis and defining a first work zone covering a first portion of an agricultural field worked by the first implement section;
    a second implement section spaced from first implement section along the axis and defining a second work zone covering a second portion of an agricultural field worked by the second implement section;
    a hinge joint arranged between the first and second sections allowing flexing of the agricultural implement for accommodating uneven surfaces of the agricultural field; and
    a pivot knuckle arranged between the hinge joint and at least one of the first and second implement sections, the pivot knuckle movable for moving the hinge joint to maintain a constant spacing along the axis between the work zones.

20. The agricultural implement of claim 19 further comprising an angle sensor arranged with respect to the first and second implement sections to provide a signal corresponding to an amount of deviation from a reference position and an actuator that moves the pivot knuckle to drive movement of the hinge joint to maintain a constant spacing along the axis between the work zones.

* * * * *